United States Patent
Corbin et al.

(10) Patent No.: US 12,112,775 B2
(45) Date of Patent: *Oct. 8, 2024

(54) VIDEO FRAMING BASED ON DEVICE ORIENTATION

(71) Applicant: GoPro, Inc., San Mateo, CA (US)

(72) Inventors: Scott Corbin, San Mateo, CA (US); Joshua Hamill, Poway, CA (US); Daryl Stimm, Encinitas, CA (US); Kyler William Schwartz, Valley Center, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,896

(22) Filed: Jun. 12, 2023

(65) Prior Publication Data

US 2023/0317115 A1    Oct. 5, 2023

Related U.S. Application Data

(63) Continuation of application No. 17/546,777, filed on Dec. 9, 2021, now Pat. No. 11,721,366, which is a continuation of application No. 16/947,348, filed on Jul. 29, 2020, now Pat. No. 11,200,918.

(51) Int. Cl.
| | |
|---|---|
| *G11B 27/034* | (2006.01) |
| *G06F 3/04847* | (2022.01) |
| *G06F 3/04883* | (2022.01) |
| *G11B 27/036* | (2006.01) |
| *G11B 27/34* | (2006.01) |

(52) U.S. Cl.
CPC ........ *G11B 27/034* (2013.01); *G06F 3/04847* (2013.01); *G06F 3/04883* (2013.01); *G11B 27/036* (2013.01); *G11B 27/34* (2013.01)

(58) Field of Classification Search
CPC ..... G11B 27/034; G11B 27/036; G11B 27/34; G06F 3/04847; G06F 3/04883
USPC .......................... 386/278, 224, 225; 348/143
See application file for complete search history.

(56) References Cited

U.S. PATENT DOCUMENTS

| | | |
|---|---|---|
| 9,743,060 B1 | 8/2017 | Matias |
| 10,319,410 B1 | 6/2019 | Townsend |
| 11,200,918 B1 * | 12/2021 | Corbin ................. G11B 27/036 |
| 2012/0096126 A1 | 4/2012 | Kamei |
| 2015/0350481 A1 | 12/2015 | Voss |
| 2015/0350535 A1 | 12/2015 | Voss |
| 2016/0005435 A1 | 1/2016 | Campbell |
| 2016/0014386 A1 | 1/2016 | Danieau |
| 2016/0381320 A1 | 12/2016 | Mate |
| 2017/0134714 A1 | 5/2017 | Soni |
| 2017/0227841 A1 * | 8/2017 | Niemela ............... H04N 13/189 |
| 2017/0255372 A1 | 9/2017 | Hsu |
| 2017/0359504 A1 | 12/2017 | Manzari |

(Continued)

*Primary Examiner* — Thai Q Tran
*Assistant Examiner* — Stephen R Smith
(74) *Attorney, Agent, or Firm* — ESPLIN & ASSOCIATES, PC

(57) ABSTRACT

A video may include visual content having a progress length. A user may interact with a mobile device to set framings of the visual content at moments within the progress length. The framings of the visual content may be provided to a video editing application. The video editing application may utilize the framings set via the mobile device to provide preliminary framings of the visual content at the moments within the progress length.

20 Claims, 10 Drawing Sheets

(56) References Cited

U.S. PATENT DOCUMENTS

| | | |
|---|---|---|
| 2018/0024724 A1 | 1/2018 | Patel |
| 2018/0059783 A1 | 3/2018 | Van Hoff |
| 2019/0012839 A1* | 1/2019 | Wang .................... G06T 19/003 |
| 2019/0187876 A1 | 6/2019 | Platt |
| 2019/0189160 A1 | 6/2019 | Huang |
| 2019/0273837 A1 | 9/2019 | Townsend |
| 2022/0101882 A1 | 3/2022 | Corbin |

* cited by examiner

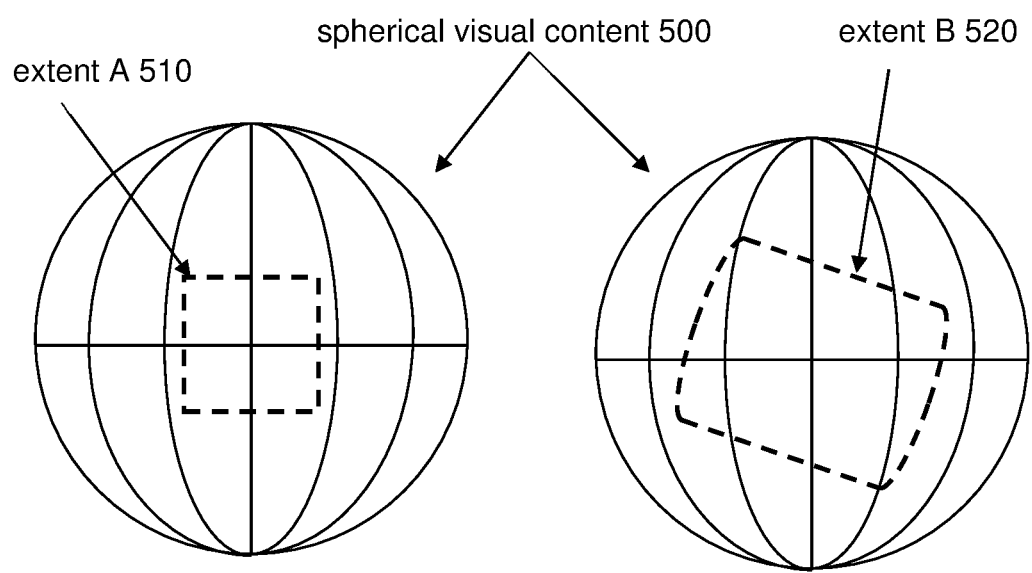
FIG. 5A  FIG. 5B

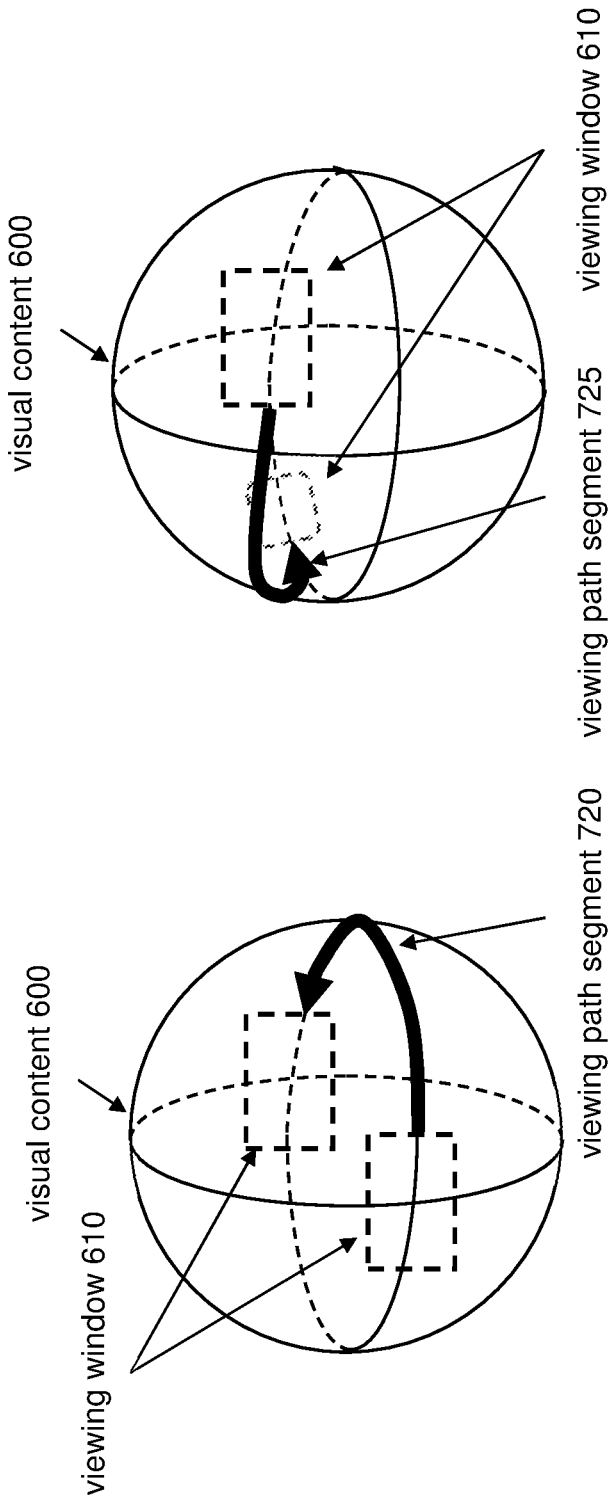

VIDEO FRAMING BASED ON DEVICE ORIENTATION

FIELD

This disclosure relates to utilizing device orientation to determine framing of videos for a video editing application.

BACKGROUND

A wide field of view video (e.g., spherical video, panoramic video) may include more visual content than may be viewed at once. Manually determining which spatial portion of the visual content should be presented may be difficult and time consuming.

SUMMARY

This disclosure relates to utilizing device orientation for video framing. Video information, framing information, and/or other information may be obtained. The video information may define a video. The video may include video content having a progress length. The video content may include visual content viewable as a function of progress through the progress length. The visual content may have a field of view. The framing information for the video may characterize one or more framings of the visual content at one or more moments within the progress length. An individual framing of the visual content may define a positioning of a viewing window within the field of view of the visual content at a corresponding moment within the progress length. The viewing window may define extents of the visual content to be included within a presentation of the video content. The framing information may be determined based on a user's interaction with a mobile device and/or other information. The mobile device may include a display. The mobile device may provide a presentation of the extents of visual content defined by the viewing window on the display to facilitate the user's interaction with the mobile device to determine the framing information. The framing information for the video may be provided to a video editing application that utilizes the framing information to provide preliminary framings of the visual content at the moments within the progress length.

A system that utilizes device orientation for video framing may include one or more electronic storage, processor and/or other components. The electronic storage may store video information defining video, information relating to video, information relating to visual content of video, framing information for video, information relating to framings of visual content, information relating to viewing window, information relating to mobile device, information relating to presentation of video content, information relate to user's interaction with mobile device, information relating to video editing application, information relating to preliminary framings of visual content of video, and/or other information.

The processor(s) may be configured by machine-readable instructions. Executing the machine-readable instructions may cause the processor(s) to facilitate utilizing device orientation for video framing. The machine-readable instructions may include one or more computer program components. The computer program components may include one or more of a video information component, a framing information component, a provision component, and/or other computer program components.

The video information component may be configured to obtain video information and/or other information. The video information may define a video. The video may include video content having a progress length. The video content may include visual content viewable as a function of progress through the progress length. The visual content may have a field of view. In some implementations, the video may include a spherical video and the field of view may include a spherical field of view. The visual content of the spherical video may be viewable from a point of view as the function of progress through the progress length.

The framing information component may be configured to obtain framing information for the video and/or other information. The framing information for the video may characterize framings of the visual content of the video at moments within the progress length. An individual framing of the visual content may define a positioning of a viewing window within the field of view of the visual content at a corresponding moment within the progress length. The viewing window may define extents of the visual content to be included within a presentation of the video content. The framing information may be determined based on a user's interaction with a mobile device and/or other information. The mobile device may include a display. The mobile device may provide a presentation of the extents of visual content defined by the viewing window on the display to facilitate the user's interaction with the mobile device to determine the framing information.

In some implementations, the individual framing of the visual content may define the positioning of the viewing window within the field of view of the visual content based on a viewing direction of the viewing window, a viewing size of the viewing window, and/or other information. In some implementations, the individual framing of the visual content may further define the positioning of the viewing window within the field of view of the visual content based on a viewing rotation of the viewing window, a viewing projection of the viewing window, and/or other information.

In some implementations, the framing information may characterize the viewing direction and/or the viewing rotation based on the framing information including orientation information of the mobile device.

In some implementations, the user's interaction with the mobile device may determine the framing information based on the user controlling orientation of the mobile device to set the viewing direction and/or the viewing rotation. In some implementations, the user's interaction with the mobile device may determine the framing information further based on the user controlling zooming operation of the mobile device to set the viewing size. In some implementations, the display of the mobile device may include a touchscreen display, and the zooming operation of the mobile device may be controlled by the user based on the user making a stretching gesture and/or a pinching gesture on the touchscreen display.

In some implementations, the framing information may characterize the framings of the visual content at non-adjacent moments within the progress length. The framings of the visual content for a duration of the progress length between the non-adjacent moments may be determined based on the framings of the visual content at the non-adjacent moments and/or other information.

In some implementations, the mobile device may further provide visual indications of the framings of the visual content at the moments within the progress length. The visual indications may be provided within the presentation of the extents of the visual content defined by the viewing window.

The provision component may be configured to provide the framing information for the video to a video editing application. The video editing application may utilize the framing information to provide preliminary framings of the visual content at the moments within the progress length.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 5A-5B illustrate example extents of spherical visual content.

FIGS. 7A and 7B illustrate examples of viewing path segments.

DETAILED DESCRIPTION

Figure 1:
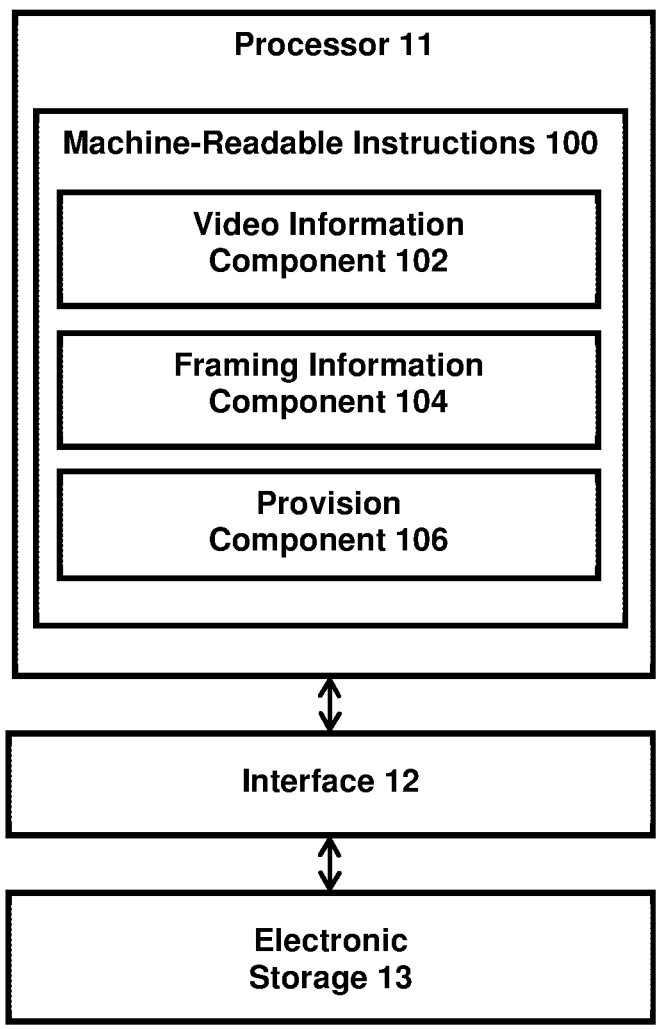
FIG. 1 illustrates a system that utilizes device orientation for video framing.

FIG. 1 illustrates a system 10 for utilizing device orientation for video framing. The system 10 may include one or more of a processor 11, an interface 12 (e.g., bus, wireless interface), an electronic storage 13, and/or other components. Video information, framing information, and/or other information may be obtained by the processor 11. The video information may define a video. The video may include video content having a progress length. The video content may include visual content viewable as a function of progress through the progress length. The visual content may have a field of view. The framing information for the video may characterize one or more framings of the visual content at one or more moments within the progress length. An individual framing of the visual content may define a positioning of a viewing window within the field of view of the visual content at a corresponding moment within the progress length. The viewing window may define extents of the visual content to be included within a presentation of the video content. The framing information may be determined based on a user's interaction with a mobile device and/or other information. The mobile device may include a display.

The mobile device may provide a presentation of the extents of visual content defined by the viewing window on the display to facilitate the user's interaction with the mobile device to determine the framing information. The framing information for the video may be provided by the processor 11 to a video editing application that utilizes the framing information to provide preliminary framings of the visual content at the moments within the progress length.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining video, information relating to video, information relating to visual content of video, framing information for video, information relating to framings of visual content, information relating to viewing window, information relating to mobile device, information relating to presentation of video content, information relate to user's interaction with mobile device, information relating to video editing application, information relating to preliminary framings of visual content of video, and/or other information.

A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of one or more images and/or one or more videos that may be consumed visually. For example, visual content may be included within one or more image and/or one or more video frames of a video. The video frame(s) may define the visual content of the video content. That is, video content may include video frame(s) that define the visual content of the video content. Video frame(s) may define visual content viewable as a function of progress through the progress length of the video content. A video frame may include an image of the video content at a moment within the progress length of the video content. A video frame may include one or more of I-frame, P-frame, B-frame, frame of pixels, and/or other video frames. Visual content may be generated based on light received within a field of view of a single image sensor or within fields of view of multiple image sensors during a capture period.

Visual content may have a field of view. A field of view of visual content may refer to an extent of a scene captured and/or viewable within the visual content. A field of view of visual content may refer to a part of a scene from which light is received for generation of the visual content. For example, the video may include a wide field of view video, such as a spherical video defining visual content viewable from a point of view as a function of progress through the progress length, and the field of view may of the spherical video may include a spherical field of view (360 degrees of capture). Other wide fields of view are contemplated. A field of view of visual content may be static (unchanging) or dynamic (changing). For example, a field of view of visual content of video content may change as a function of progress through the progress length of the video content. Other fields of view are contemplated.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a location. Spherical video content may be captured through the use of one or more image capture devices to capture images/videos from a location.

The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be consumed as virtual reality content. Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video content captured from a path taken by the image capture device(s) in the moving position. For example, spherical video content and/or virtual reality content may include video content captured by a spherical camera of a person walking around or riding in a vehicle.

Figure 3:
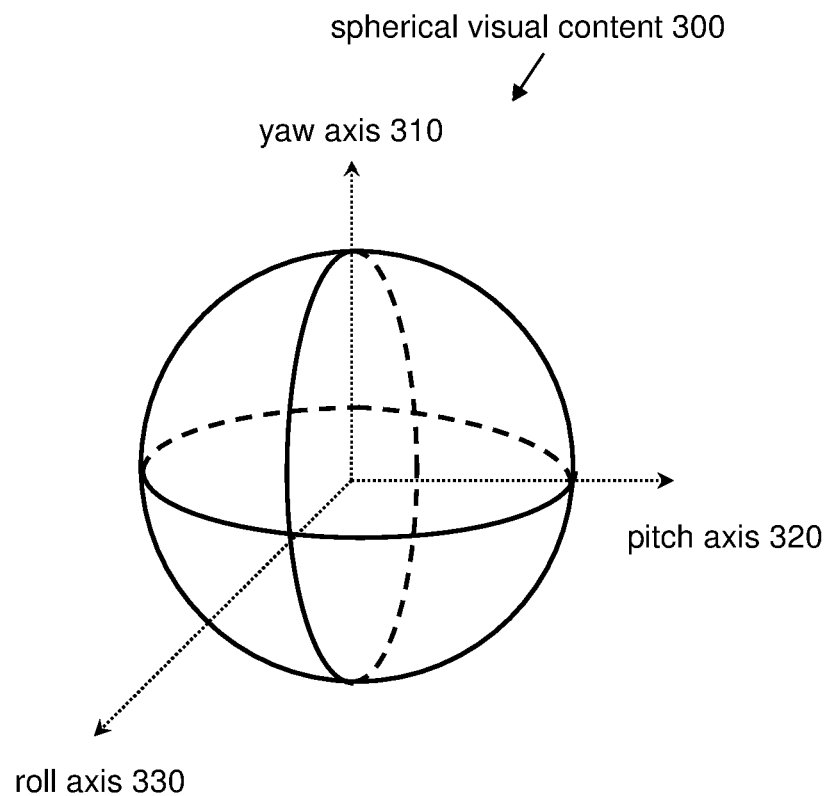
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content to be included within a presentation of the video content. For example, the viewing window may define extents of the video content to be presented on display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
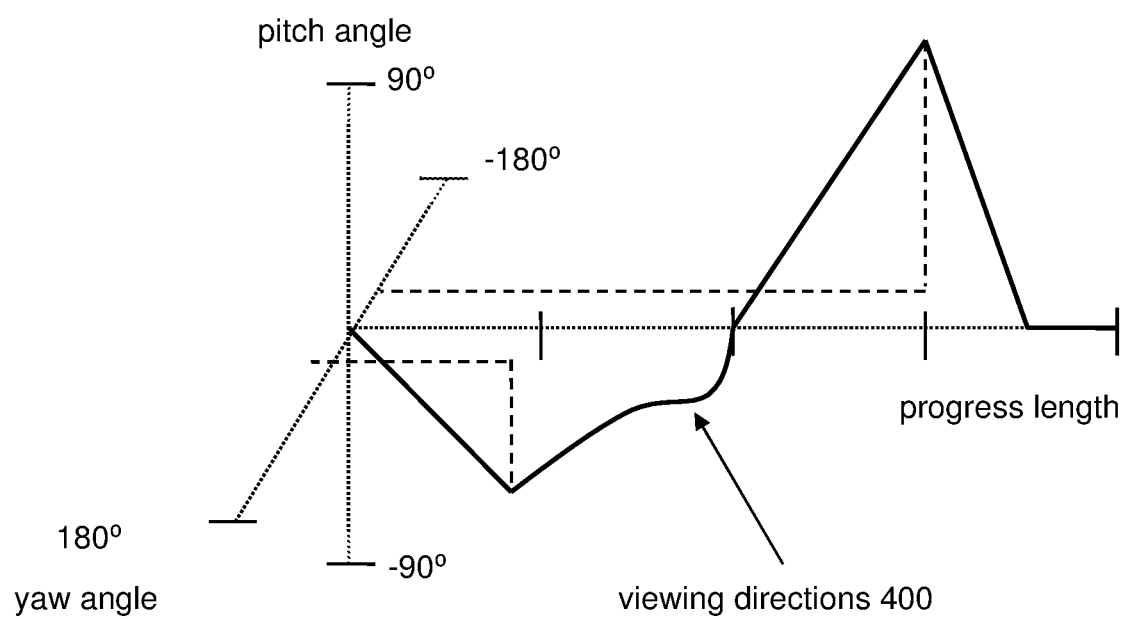
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of the viewing window. A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

FIGS. 5A-5B illustrate examples extents of spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

In some implementations, the viewing window may be characterized by a viewing projection. A viewing projection may define how pixels within the viewing window is arranged for presentation on a display. A viewing projection may define how the pixels of an image are arranged to form the visual content. A viewing projection may refer to how portions of the visual content/pixels are mapped onto a two-dimensional plane (e.g., two-dimensional image). For example, a viewing projection may arrange pixels of the image such that one or more visual elements (defined by one or more pixels) of the visual content are stretched (e.g., at the top or bottom of an image arranged using an equirectangular projection) or not stretched (e.g., middle of an image arranged using a rectilinear projection). Example viewing projections may include rectilinear projection, cylindrical projection, Mercator projection, Miller projection, Lambert projection, equirectangular projection, stereographic projection, fisheye projection, equisolid projection, orthographic projection, cubic projection, sinusoidal projection, transverse projection (rotation of a projection by 90 degrees), Panini projection, architectural projection, and/or other viewing projections.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate utilizing device orientation for video framing. The machine-readable instructions 100 may include one or more computer program components. The machine-readable instructions 100 may include one or more of a video information component 102, a framing information component 104, a provision component 106, and/or other computer program components.

The video information component 102 may be configured to obtain video information and/or other information. Obtaining video information may include one or more of accessing, acquiring, analyzing, determining, examining, generating, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining a video during acquisition of the video and/or after acquisition of the video by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information may be obtained based on a user's interaction with a user interface/application (e.g., video editing application, video player application), and/or other information. For example, a user interface/application may provide option(s) for a user to select one or more videos to be presented and/or for which video framings are to be determined. The video information defining the video(s) may be obtained based on the user's selection of the video(s) through the user interface/video application.

The video information may define a video (e.g., non-spherical video, spherical video, panoramic video). The video information may define a video by including information that defines one or more content, qualities, attributes, features, and/or other aspects of the video. For example, the video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. For example, the video information may include information that makes up and/or is used to determine pixels of video frames of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The framing information component 104 may be configured to obtain framing information for the video and/or other information. Obtaining framing information may include one or more of accessing, acquiring, analyzing, determining, examining, generating, identifying, loading, locating, opening, receiving, retrieving, reviewing, storing, and/or otherwise obtaining the framing information. The framing information component 104 may obtain framing information from one or more locations. For example, the framing information component 104 may obtain framing information from a storage location, such as the electronic storage 13, electronic storage of a device accessible via a network, and/or other locations. The framing information component 10r may obtain framing information from one or more hardware components (e.g., computing device, electronic storage, mobile device) and/or one or more software components (e.g., software running on a computing device, software running on a mobile device). Framing information may be stored within a single file or multiple files.

In some implementations, the framing information component 104 may obtain framing information based on the video information and/or the video information component 102 obtaining the video information. For example, the framing information may be associated with the video/video information obtained by the video information component 102, and the framing information component 104 may obtain the associated framing information based on obtaining of the video information. The framing information may be included within metadata of the obtained video, and the framing information may be obtained based on obtaining (e.g., selection, retrieval) of the video. The framing information may be included within the video information, and the framing in information component 104 may obtain framing information by extracting the framing information from the video information.

The framing information for the video may characterize framings of the visual content of the video at one or more moments within the progress length. The framing information for the video may characterize framings of the visual content by describing, defining, and/or otherwise characterizing framings of the visual content at moment(s) within the progress length. A moment within the progress length may include a point (e.g., a point in time, a video frame) or a duration (e.g., a duration of time, a grouping of adjacent video frames) within the progress length. For example, the framing information for the video may characterize same or different framings of the visual content of the video at different moments within the progress length. The framing information for the video may characterize multiple framings of the visual content of the video at same and/or different moments within the progress length.

An individual framing of the visual content may define a positioning of a viewing window within the field of view of the visual content at a corresponding moment within the progress length. The viewing window may define extents of the visual content to be included within a presentation of the video content. A positioning of the viewing window within the field of view of the visual content may refer to placement of the viewing window within the field of view of the visual content. The positioning/placement of the viewing window may be defined by one or more of viewing direction, viewing size, viewing rotation, and/or other information. An individual framing of the visual content may define arrangement of pixels within the viewing window for presentation. The arrangement of the pixels within the viewing window may be defined by viewing projection and/or other information.

A positioning/placement of a viewing window within the field of view of the visual content may be effectuated through movement (translational movement, rotational movement) of the viewing window with respect to the field of view of the visual content and/or through movement of the field of view of the visual content (e.g., movement of the visual content in the image space). The positioning/placement of the viewing window may determine framing of the visual content. In some implementations, direction, shape, size, projection, and/or other characteristics of the viewing window may be selected to determine the framing of the visual content. The characteristics of the viewing window may determine how the extent of the visual content within the viewing window is framed for presentation. For example, an individual framing of the visual content may define the positioning of the viewing window within the field of view of the visual content based on a viewing direction of the viewing window, a viewing size of the viewing window, and/or other information. The individual framing of the visual content may further define the positioning of the viewing window within the field of view of the visual content based on a viewing rotation of the viewing window, a viewing projection of the viewing window, and/or other information.

The framing information may be determined based on a user's interaction with a mobile device and/or other information. A mobile device may refer to a portable computing device. A mobile device may refer to a computing device that is small enough to be held and operated in hand, such as a smartphone and/or a tablet. Other mobile devices are contemplated. The mobile device may include one or more displays. In some implementations, one or more displays of the mobile device may include touchscreen display(s). The mobile device may provide a presentation of the visual content of the video on one or more displays. The mobile device may provide a presentation of the extents of visual content defined by the viewing window on the display(s). The extents of the visual content defined by the viewing window may be presented on the display(s) to facilitate the user's interaction with the mobile device to determine the framing information (to set the framing of the visual content). As the user interacts with the mobile device to change the framing of the visual content, the selected framing of the visual content may be presented on the display(s), allowing the user to see how the visual content will be framed during playback.

A user's interaction with the mobile device to determine the framing information may include the user acting on the mobile device and/or operating the mobile device in one or more ways to determine the framing information. A user's interaction with the mobile device may include the user interacting with one or more buttons (e.g., physical buttons, virtual buttons presented on the display) of the mobile device and/or the user changing the orientation of the mobile device. The mobile device may include one or more positions sensors (e.g., inertial measurement unit, accelerometer, gyroscope, magnetometer) to measure the orientation of the mobile device.

A user's interaction with the mobile device to determine the framing information may include the user interacting with the mobile device to specify one or more framings of the visual content at one or more moments within the progress length of the video. For example, a user may interact with the mobile device to select moments within the progress length to specify framings of the visual content at the corresponding content. The user may specify the framings of the visual content by setting one or more characteristics of the viewing window at the corresponding moments. For example, the user may interact with the mobile device to set, for a corresponding moment within the progress length, one or more of the viewing direction, the viewing size, the viewing rotation, the viewing projection, and/or other information to define the framing of the visual content.

In some implementations, the user's interaction with the mobile device may determine the framing information based on the user controlling orientation of the mobile device to set the viewing direction and/or the viewing rotation. The user may change the orientation (rotational position) of the mobile device (e.g., with respect to ground) to change the viewing direction. That is, the user may rotate the mobile device to change the direction in which the viewing window is pointed/located within the field of view of the visual content to look at different extents of the visual content. For instance, the user may rotate the mobile device about the yaw axis and/or the pitch axis to change the viewing direction for the visual content in the direction of rotation (e.g., rotating to the right, left, pitch-up, pitch-down). The user may rotate the mobile device (e.g., tilt to right, left) to change the viewing rotation for the video content.

The position sensor(s) of the mobile device may record the orientation/changes in orientation of the mobile device and store them as orientation information of the mobile device. The orientation information may characterize orientation of the mobile device as a function of the progress length of the video, which may be used to determine the viewing direction and/or the viewing rotation of the viewing window as the function of the progress length of the video. In some implementations, the framing information may characterize the viewing direction and/or the viewing rotation based on the framing information including orientation information of the mobile device.

Thus, the user may move the mobile device as a control device to perform 3D spatial navigation of the visual content. The user may orient the mobile device in different positions within the real world to see different extents of the visual content. The user may explore the visual content in both space (different extents of the visual content) and time (different moments within the progress length) to determine framings of the visual content at different moments within the progress length of the video. Such determinations of video framing may be more intuitive and natural than traditional video framing using video editing applications, where the position of the display remains static and different extents of the visual content are explored via user command received through mouse/keyboard.

In some implementations, the user's interaction with the mobile device may determine the framing information further based on the user controlling zooming operation of the mobile device to set the viewing size. The zooming operation of the mobile device may refer to operation of the mobile device that changes the size of the viewing window (viewing size). For example, the mobile device may include physical buttons mapped to zoom-in and zoom-out operations, and the zooming operation of the mobile device may be controlled by the user based on the user pressing the corresponding physical buttons to decrease/increase the viewing size. The mobile device may include a touchscreen display, which presents virtual buttons mapped to zoom-in and zoom-out operations, and the zooming operation of the mobile device may be controlled by the user based on the user pressing the corresponding virtual buttons to decrease/increase the viewing size. The mobile device may include a touchscreen display, and the zooming operation of the mobile device may be controlled by the user based on the user making a stretching gesture (e.g., zoom in) and/or a pinching gesture (e.g., zoom out) on the touchscreen display to decrease/increase the viewing size. The zooming operation of the mobile device may be tied to its location (e.g., translational location), and the zooming operation of the mobile device may be controlled by the user based on the use moving the mobile device forward (e.g., zoom in) or backward (e.g., zoom out) to decrease/increase the viewing size.

The user may interact with the mobile device to continuously set the framings of visual content and/or to set the framings of visual content at non-adjacent moments within the progress length. For example, the user may interact with the mobile device (e.g., press a "record" button) to start "recording" the framings of visual content using the mobile device. After the "recording" has started, the orientation information of the mobile device may be stored to characterize the viewing direction and/or the viewing rotation of the viewing window at a rate that is needed to specify viewing direction for individual moments/video frames that will be presented on playback. Adjacent sampling moments based on the rate may be referred to as adjacent moments within the progress length. Such setting of the framings may enable a user to move the mobile device to "record" desired views of the visual content while the visual content is being played. The user may position the mobile device at different orientations, and the changes in the orientations of the mobile device may be recorded at a rate to provide framings of the visual content at the adjacent moments. In some implementations, the framing information may characterize the framings of the visual content at the adjacent moments within the progress length.

As another example, the user may interact with the mobile device to set the framings of the visual content at non-continuous/non-adjacent moments within the progress length of the video. The user may navigate to a particular moment within the progress length and set the framing for the particular moment, then jump to a different (e.g., future, past) moment within the progress length and set the framing for the different moment. In some implementations, the framing information may characterize the framings of the visual content at non-adjacent moments within the progress length. The framings at the non-adjacent moments may provide a beginning framing and an ending framing for the duration between the non-adjacent moments. The framings of the visual content for duration(s) of the progress length between the non-adjacent moments may be determined based on the framings of the visual content at the non-adjacent moments and/or other information. That is, for a pair of non-adjacent moments for which framings are set, the framings of the visual content between the non-adjacent moment (e.g., a duration of time between two non-adjacent moments), may be determined based on the preceding framing at the preceding non-adjacent moment, the subsequent framing at the subsequent non-adjacent moment, and/or other information. For example, one or more splines that goes through the preceding viewing direction and the subsequent viewing direction may be used to determine the changes in viewing directions between the pair of non-adjacent moments.

In some implementations, the user may interact with the mobile device to change which portions of the progress length of the video are to be included and/or not included within the presentation of the visual content. For example, the user may interact with the mobile device to scrub forward in time to provide a jump cut in the presentation. In some implementations, the user may pause the presentation of the visual content on the mobile device to provide one or more effects in the playback of the visual content. For example, the user may pause the presentation of the visual content on the mobile device and change the viewing direction to provide a cut change in the viewing direction (rather than a panning change in viewing direction). As another example, the user may pause the presentation of the visual content on the mobile device and "record" the orientation of the mobile device during the pause to provide a panning shot of the visual content at the paused moment. This may create an effect in the playback of the visual content where the paused moment (e.g., a point in time, a video frame) is repeated to provide a paused shot of the moment, and the playback shows different extents of the paused moment. Such a framing may be referred to as a moment-to-duration framing.

A moment-to-duration framing may refer to a framing that changes the progress length of the video/visual content. For example, a moment-to-duration framing may extend a moment (e.g., point in time, duration of time) within the progress length to a duration longer than the moment within the progress length/presentation of the video content. A moment-to-duration framing may include visual content at a point within the progress length that has been duplicated over a duration longer than the point. For instance, a video frame corresponding to the moment-to-duration framing may be duplicated into multiple video frames so that the same content within the video frame is presented during the duration corresponding to the moment-to-duration framing.

As another example, a moment-to-duration framing may include a video segment with the playback rate and/or playback direction defined by the moment-to-duration framing. For instance, video frames corresponding to the moment-to-duration framing may be played back at a playback rate different (e.g., faster, slower) than the normal playback rate (1× speed) and/or the order/direction in which the video frames are presented may be changed (e.g., forward playback direction, reverse playback direction).

A moment-to-duration framing may include multiple sub-framings within the duration of the moment-to-duration framing. A sub-framing may refer to a framing within the duration of the moment-to-duration framing. The multiple sub-framings within the duration may enable different portions of the visual content corresponding to the duration to be included within a presentation of the visual content. For example, for a moment-to-duration framing that extend a moment (e.g., point in time, duration of time) within the progress length to a duration longer than the moment within the progress length/presentation of the video content, multiple sub-framings may simulate the video being paused for the duration and different portions of the visual content being presented while the video is paused.

Figure 6C:
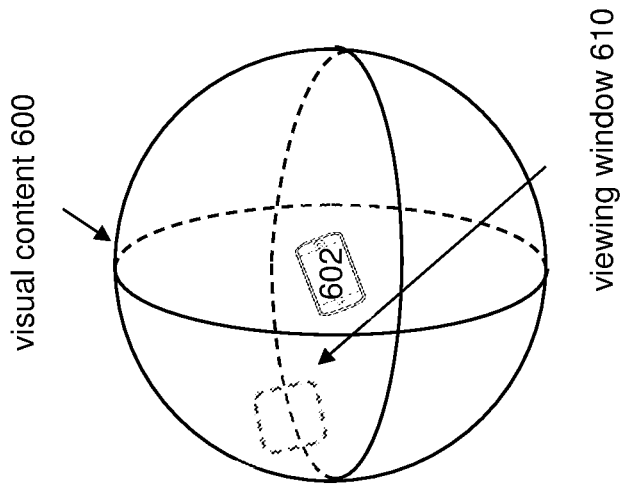
FIGS. 6A, 6B, 6C, and 6D illustrate example framings of visual content.
Figure 6B:
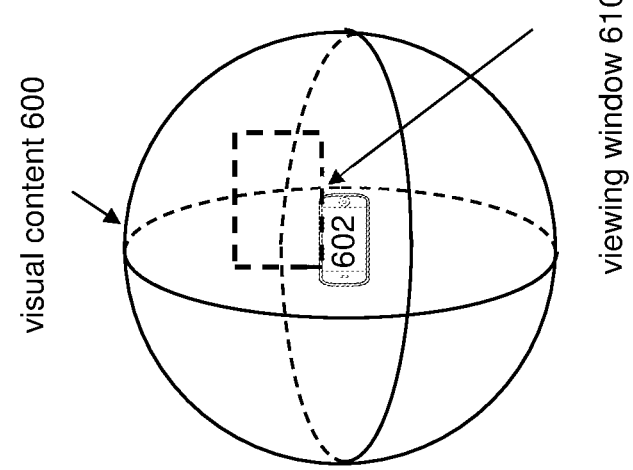
Figure 6A:
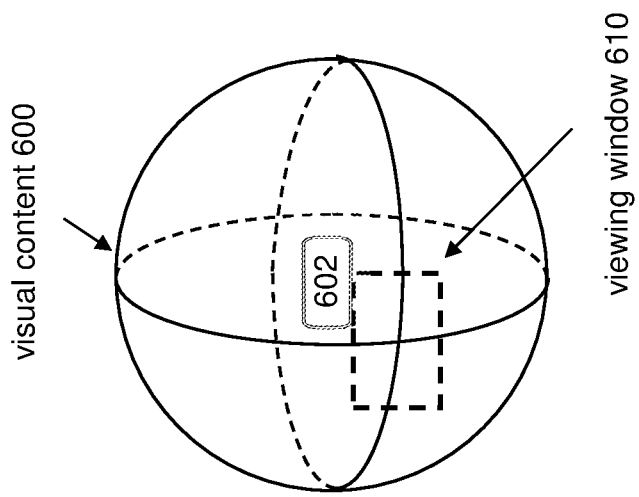

FIGS. 6A, 6B, and 6C illustrate example framings of visual content 600 at different moments within the progress length of the visual content 600. For instance, the visual content 600 may include visual content of a video, and FIGS. 6A, 6B, and 6C may illustrate the visual content 600 within different video frames of the video (content of the video frames at different moments within the progress length). For example, as shown in FIG. 6A, framing of the visual content 600 at a first moment within the progress length may include a viewing window 610 being positioned at the front of the visual content 600 and being leveled within the visual content 600. Such framing of the visual content 600 may be determined based on a mobile device 602 being horizontally leveled and a back of the mobile device 602 being pointed in a front direction (direction corresponding to the front of the visual content 600). As shown in FIG. 6B, a framing of the visual content 600 at a second moment (subsequent to the first moment) within the progress length may include the viewing window 610 being positioned at the back of the visual content 600 and being leveled within the visual content 600. Such framing of the visual content 600 may be determined based on a mobile device 602 being horizontally leveled and the back of the mobile device 602 being pointed in a back direction (direction corresponding to the back of the visual content 600). As shown in FIG. 6C, a framing of the visual content 600 at a third moment (subsequent to the second moment) within the progress length may include the viewing window 610 being positioned at front-upper-right of the visual content 600. The framing of the visual content 600 at the third moment may include the viewing window 610 being tilted and having a different dimension (e.g., different shape, smaller size) than the framing of the visual content at the first moment and the second moment. Such framing of the visual content 600 may be determined based on a mobile device 602 being tiled/pitched, the user interacting with a touchscreen of the mobile device to change the viewing size of the viewing window, and the back of the mobile device 602 being pointed in an upper right direction. Other framings of the visual content are contemplated.

Figure 6D:
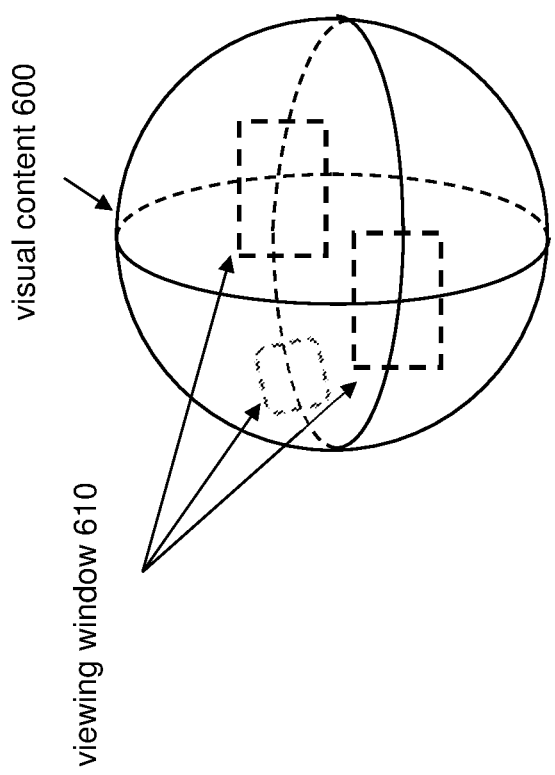

FIG. 6D illustrate an example moment-to-duration framing of visual content 600. The visual content 600 may correspond to visual content of a video at a moment (e.g., a point in time) within the progress length of the video. For example, the visual content 600 may be visual content of a video frame within the video. The moment-to-duration framing of the visual content 600 may extend the moment within the progress length to a duration longer than the moment within the progress length/presentation of the video content. The moment-to-duration framing of the visual content 600 may include the visual content 600 being duplicated over the duration (the video frame being duplicated to extend the duration) so that the presentation of the video appears to be paused during playback of the duration. The moment-to-duration framing of the visual content 600 may include multiple sub-framings within the duration. For example, as shown in FIG. 6, the moment-to-duration framing of the visual content 600 may include three sub-framings within the duration. For instance, the multiple sub-framings of the visual content 600 may include the viewing window 610 being positioned (1) at the front of the visual content 600 and being leveled within the visual content 600 at the beginning of the duration, (2) at the back of the visual content 600 and being leveled within the visual content 600 within the duration (e.g., at the mid-point, at non-midpoint), and (3) at front-upper-right of the visual content 600 and being tiled and having a different dimension at the end of the duration. Other sub-framings of the visual content are contemplated.

The viewing directions of the viewing window may form a viewing path for the video. A viewing path may refer to a path or a progression of the positioning of the viewing window within the field of view of the visual content as the function of progress through the progress length. A viewing path may define the positioning of the viewing window within the field of view of the visual content as the function of progress through the progress length. A viewing path may define one or more of viewing direction, viewing size, viewing rotation, viewing projection, and/or other information to define the positioning of the viewing window within the field of view of the visual content.

The positioning of the viewing window defined by the viewing path may include the positioning of the viewing window defined by the multiple framings of the visual content. Different framings of the visual content at different moments within the process length may dictate the positioning of the viewing window defined by the viewing path. Different framings of the visual content at different moments within the process length may define fixed positionings of the viewing window within the viewing path. The viewing path may include the viewing directions set by the user in setting the framings of the visual content. For instance, the multiple framings may reflect a user's intended spatial and temporal positioning of the viewing window for a spherical video and the viewing path may define a path on the sphere that takes into account the user's designations (e.g., markers) that reflect which portions of the spherical video should be presented during playback.

In some implementations, the viewing path may reflect the viewing direction, the viewing size, the viewing rotation, and/or the viewing projection specifically selected by the user by controlling the orientation of the mobile device. In some implementations, the viewing path may reflect interpolated viewing directions, interpolated viewing size, interpolated viewing rotation, and/or interpolated viewing projection determined based on the viewing directions, the viewing size, the viewing rotation, and/or the viewing projection specifically selected by the user. In some implementations, the viewing path may reflect interpolated viewing directions, determined based on the viewing directions specifically selected by the user. The viewing path may reflect interpolated viewing size determined based on the viewing size specifically selected by the user. The viewing path may reflect interpolated viewing rotation determined based on the viewing rotation specifically selected by the user. The viewing path may reflect interpolated viewing projection determined based on the viewing projection specifically selected by the user. For instance, individual segments within the viewing path may be determined based on framings of the visual content at the start and the end of the segments.

FIGS. 7A and 7B illustrate examples of viewing path segments 720, 725. The viewing paths 720, 725 may be determined based on the framings of the visual content 600 shown in FIGS. 6A, 6B, and 6C. The framings of the visual content 600 shown in FIGS. 6A, 6B, and 6C may define fixed positionings of the viewing window 610 for the visual content 600 at different moment within the progress length of the visual content 600. The viewing path for the visual content may be determined to include the viewing path segment 720, 725.

The adjacent framings shown in FIGS. 6A and 6B may be used to determine the viewing path segment 720. Adjacent framings of the visual content may define fixed positionings of the viewing window within the viewing path at their corresponding moments (at the first moment and the second moment). The viewing path segment 720 may be determined to include the fixed positionings of the viewing window within the viewing path so that the viewing path segment 720 starts (at the first moment) with the viewing window 610 positioned at the front of the visual content 600 and being leveled within the visual content 600 and ends (at the second moment) with the viewing window 710 positioned at the back of the visual content 600 and being leveled within the visual content 600.

The viewing path segment 720 may be determined to include changes in the positioning of the viewing window between the fixed positionings of the viewing window within the viewing path segment 720 so that one or more of the viewing direction, the viewing size, the viewing rotation, and/or the viewing projection for the viewing window 610 changes from the being positioned at the front of the visual content 600 and being leveled within the visual content 600 to being positioned at the back of the visual content 600 and being leveled within the visual content 600. For instance, in FIG. 7A, the viewing path segment 720 may include changes in the viewing direction of the viewing window 610 from being pointed in the front of the sphere to the back of the sphere.

The adjacent framings shown in FIGS. 6B and 6C may be used to determine the viewing path segment 725. Adjacent framings of the visual content may define fixed positionings of the viewing window within the viewing path at their corresponding moments (at the second moment and the third moment). The viewing path segment 725 may be determined to include the fixed positionings of the viewing window within the viewing path so that the viewing path segment 725 starts (at the second moment) with the viewing window 610 positioned at the back of the visual content 600 and being leveled within the visual content 600 and ends (at the third moment) with the viewing window 710 positioned at front-upper-right of the visual content 600, being tilted, and having a different dimension (e.g., different shape, smaller size) than the positioning of the visual content at the first moment and the second moment.

The viewing path segment 725 may be determined to include changes in the positioning of the viewing window between the fixed positionings of the viewing window within the viewing path segment 725 so that one or more of the viewing direction, the viewing size, the viewing rotation, and/or the viewing projection for the viewing window 610 changes from the being positioned at the back of the visual content 600 and being leveled within the visual content 600 and ends with the viewing window 710 positioned at front-upper-right of the visual content 600, being tilted, and having a different dimension. For instance, in FIG. 7B, the viewing path segment 725 may include changes in the viewing direction of the viewing window 610 from being pointed to the back of the sphere to the front-upper-right of the sphere. The viewing path segment 725 may include changes in the viewing size of the viewing window 610 from being rectangular in shape to be a smaller square in shape. The viewing path segment 725 may include changes in the viewing rotation of the viewing window 610 from being leveled to being tilted. In some implementations, viewing rotations of the fixed positioning of the viewing window may be ignored and the viewing window may be leveled (with respect to horizon) to provide a leveled view of the visual content. The viewing path segment 725 may include changes in the viewing projection of the viewing window 610 from one type of viewing projection to another type of viewing projection. Other changes in the positioning of the viewing window are contemplated.

One or more types of interpolations may be used to determine changes in the positioning of the viewing window between fixed positionings of the viewing window within the viewing path. For example, a linear interpolation may be used to determine changes in the positioning of the viewing window along the viewing path segment 720 so that the viewing direction changes linearly (the same amount of change in viewing direction for the same amount of the progress length) from being pointed to the front of the sphere to the back of the sphere. A non-linear interpolation may be used to determine changes in the positioning of the viewing window along the viewing path segment 725 so that the viewing direction changes non-linearly (different amount of change in viewing direction for the same amount of the progress length) from being pointed to the back of the sphere to the front-upper-right of the sphere. For instance, an S-type non-linear curve may be used for non-linear interpolation so there are (1) smaller changes in the viewing direction in the beginning and the end of the viewing path segment 725 and (2) larger changes in the viewing direction in the middle of the viewing path segment 725, or vice versa. Other types of non-linear interpolation for changes in the positioning of the viewing window are contemplated.

In some implementations, the viewing path may be changed based on user interaction with the mobile device, and/or other information. For example, the user may interact with the mobile device to add a new framing, remove an existing framing, and/or modify an existing framing. The viewing path may be changed based on addition of the new framing of the visual content, removal of the existing framing of the visual content, and/or modification (e.g., modification of viewing direction, viewing size, viewing rotation, and/or viewing projection) of the existing framing of the visual content.

In some implementations, framings set by the user via interaction with the mobile device may be smoothed. The framings sets by the user via interaction with the mobile device may include rough interactions, which may result in rough presentation of the visual content. For example, a user may change the orientation of the mobile device to change the viewing direction for the visual content. However, the motion to change the orientation may not be smooth, such as based on unintentional shaking of the user's hand and/or unintentional jerkiness in the motion, which may result in shaky/jerky changes in the viewing direction during presentation of the visual content within the viewing window. As another example, a user may change the size of the viewing window by making stretching and/or pitching gestures on a touchscreen display. The user's finger motion across the surface of the touchscreen display may not be smooth. For instance, the user's finger(s) may catch on the touchscreen display and the jerky motion of the finger(s) may result in a jerky zoom-in on the visual content. That is, rather than smoothly changing the zoom with which the visual content may be viewed, the change in zoom for viewing the video content may include stagger, jitter, and/or other jerk in change. Other undesirable changes in the viewing direction, viewing rotation, viewing size, and/or viewing projection of the viewing window due to user interaction with the mobile device are contemplated.

Framings set by the user via interaction with the mobile device may be smoothed to provide smooth presentation of the visual content within the viewing window. Changes in framings of the visual content may be smoothed so that changes in viewing direction, viewing rotation, viewing size, and/or viewing projection used to present the visual content are smoother (e.g., includes less jitters, shakes) than the changes set via the user's interaction with the mobile device. The framings of the visual content may be smoothed by changing the values of the viewing direction, viewing rotation, viewing size, and/or viewing projection from original values to smoothed values. In some implementations, the framings of the visual content may be smoothed by reducing the frequency of framings included in the framing information. For example, the framing information may define orientation data of the mobile device for every 10 milliseconds. The frequency of the orientation data may be reduced to create sparse orientation data and curve fit may be used on the sparse orientation data to determine the framings of the visual content.

Figure 8:
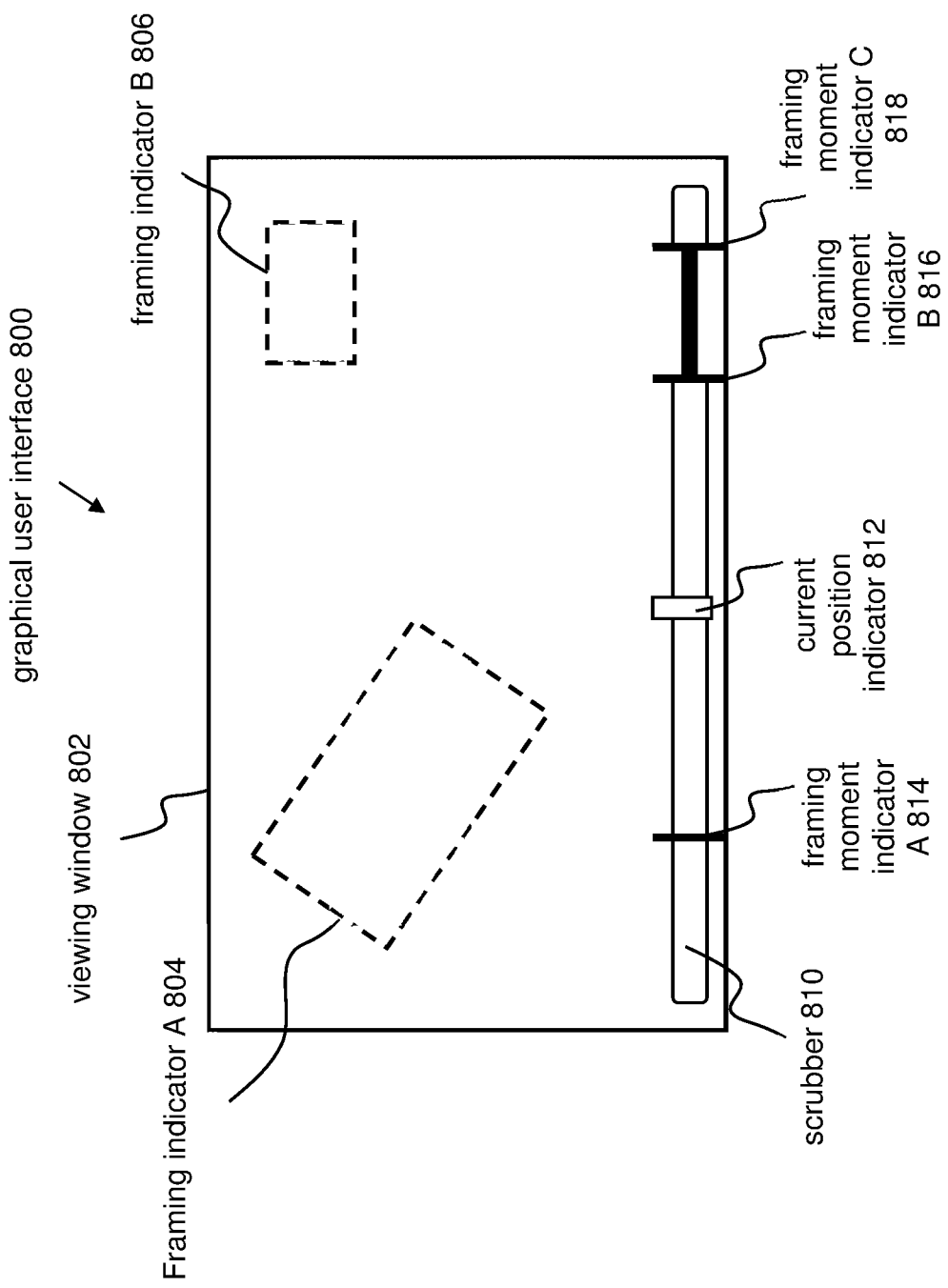
FIG. 8 illustrates an example graphical user interface for video framing.

In some implementations, one or more graphical user interfaces may be presented on one or more displays of the mobile device. The graphical user interface(s) may provide information and/or enable a user to provide inputs to the mobile device to facilitate the user's interaction with the mobile device to determine the framing information. FIG. 8 illustrates an example graphical user interface 800 for video framing. Other types and configurations of graphical user interface are contemplated.

The graphical user interface 800 may be presented on one or more displays of the mobile device. The graphical user interface 800 may include presentation of visual content. The graphical user interface 800 may include presentation of extents of the visual content defined by (within) a viewing window 802. The graphical user interface 800 may include a scrubber 810. The scrubber 810 may represent the progress length of the video/visual content. A current position indicator 812 may indicate the current moment of the video/visual content being presented. That is, the visual content of the video displayed on the display(s) of the mobile device may correspond to the moment indicated by the current position indicator 812. In some implementations, a user may be able to change the position of the current position indicator 812 along the scrubber 810 to change which portion of the video/visual content is displayed.

The graphical user interface 800 may include framing moment indicators, such as a framing moment indicator A 814, a framing moment indicator B 816, and a framing moment indicator C 818. The framing moment indicators 814, 816, 818 may be positioned on/along the scrubber 810, and may visually indicate the moments at which framings of the visual content have been set. A line between the framing moment indicator C 818 and the framing moment indicator D 820 may visually represent a moment-to-duration framing. For example, a video frame at the point in time corresponding to the framing moment indicator C 818 may have been duplicated to extent the progress length of the video/visual content. The framing moment indicators may provide visual cues as to the temporal locations of the preceding and/or next framings.

The graphical user interface 800 may include framing indicators to visually represent the positioning of the viewing window for moments within the progress length. The inclusion of the framing indicators within the graphical user interface 800 may enable the mobile device to provide visual indications of the framings of the visual content at the moments within the progress length. These visual indications may be provided within the presentation of the extents of the visual content defined by the viewing window. For example, the framing indicators may be overlaid on top of the visual content presented on the display(s) of the mobile device. For example, referring to FIG. 8, the graphical user interface 800 may include a framing indicator A 804 and a framing indicator B 806. The framing indicator A 804 may visually represent the positioning of the viewing window within the field of view of the visual content for the moment corresponding the framing moment indicator A 814. The framing indicator B 806 may visually represent the positioning of the viewing window within the field of view of the visual content for the moment corresponding the framing moment indicator B 816.

In some implementations, framing indicators may be presented for framings that are outside the current framing of the visual content. For example, one or more arrows and/or other visual indicators may be presented at the periphery of the display to indicate in which direction the preceding and/or next framings are located. In some implementations, different types of visual indicators may be presented based on the distance between the current framing (as shown within the viewing window 802) and the preceding and/or next framings. For example, the size, shape, and/or color of the arrow(s) and/or other visual indicators may change based on the distance between the current framing and the preceding and/or next framings.

Presentation of the framing indicators may enable a user to see where one or more preceding framings and/or one or more subsequent framings are positioned with respect to current framing of the visual content. The framing indicators may provide visual cues as to the spatial locations of the preceding and/or next framings.

In some implementations, prominence of the framing moment indicators and/or the framing indicators may change based on the amount of difference between the current moment being presented within the graphical user interface 800 and the moments corresponding to the framing moment indicators/framing indicators. For example, appearance of the framing moment indicators and/or the framing indicators may change based on the difference between the current moment being presented within the graphical user interface 800 and the moments corresponding to the framing moment indicators/framing indicators. For instance, closer the moments corresponding to the framing moment indicators/framing indicators are to the current moment (indicated by the current position indicator 812), the appearance of the framing indicators may be made more prominent (e.g., different colors for different differences, darker colors for closer moments). As the presentation of the video/visual content within the graphical user interface 800 approaches a framing moment, the corresponding framing indicator may gain visual prominence. As presentation of the video/visual content within the graphical user interface 800 goes past the framing moment, the corresponding framing indicator may lose visual prominence (e.g., diminishes) until it disappears from view. Other visual changes to change the prominence of the framing moment indicators and/or the framing indicators are contemplated.

The user may interact with the graphical user interface 800 to set framings for different moments within the progress length of the video/visual content. The user may interact with the graphical user interface to add, remove, and/or modify framings of visual content. For example, the graphical user interface 800 may include a button that may be pushed by the user to set the current view presented within the viewing window 802 as the framing for the corresponding moment. For example, the user may interact with the framing indicators, the framing moment indicators, and/or other buttons to modify and/or remove an existing framing. The user may move forward and/or backward in the progress length of the video/visual content to see where framings of the visual content are located. In some implementations, one or more visual, audio, and/or haptic feedback may be provided to indicate presence of the framings. For example, an audio que may be provided to indicate the location of the next framing, such as by using words that direct the user to the location of the next framing and/or using spatial audio to indicate relative position of the next framing with respect to current framing.

In some implementations, the graphical user interface 800 may provide information on changes to an existing framing. For example, the user may, at a moment indicated by the current position indicator 812 in FIG. 8, begin recording orientation of the mobile device to determine viewing directions of the viewing window. When the presentation of the visual content approaches/reaches the moment corresponding to the framing moment indicator B 816, the graphical user interface 800 may provide visual cues to indicate that the play position is approaching/has reached an existing framing. In some implementations, the user may be prevented from indirectly changing the existing framing, and may be required to manually remove the existing framing. In some implementations, the user may be allowed to change the existing framing by "recording" new orientation of the mobile device over the existing framing. In some implementations, the user may be given the option of keeping or replacing the existing framing.

The provision component 106 may be configured to provide the framing information for the video to a video editing application. Providing framing information may include one or more of sending, supplying, interpreting, making available, offering, and/or otherwise providing the framing information to the video editing application. The provision component 106 may provide to the video editing application the same framing information obtained by the framing information component 104 and/or may provide to the video edit application different framing information. For example, the provision component 106 may obtain framing information from a mobile device by retrieving the orientation information of the mobile device. The provision component 106 may modify the retrieved orientation information or generate new framing information based on the retrieved orientation information. The modified/new framing information may include the orientation information of the mobile device into converted into framing information (e.g., information defining positioning of the viewing window) for use by the video editing application. As another example, the provision component 106 may retrieve the orientation information of the mobile device and provide the orientation information to the video editing application, and the video editing application may analyze the orientation information to determine framing of the visual content in accordance with the orientation information. Other provisions of the framing information are contemplated.

A video editing application may refer to an application (software, program, tool, plugin) that enables a user to edit a video. A video editing application may provide one or more options to edit a video, such as options to determine which spatial and/or temporal portions of the video are to be included within a video edit, options to determine the order in which the selected spatial and/or temporal portions are to be included within the video edit, and/or options to determine which effects (e.g., visual effects, audio effects) are to be included within the video edit. For instance, a video editing application may provide one or more options to edit a spherical video.

The framing information may be provided to the video editing application for use in providing preliminary framings of the visual content at the moments within the progress length. The video editing application may utilize the framing information to provide preliminary framings of the visual content at the moments within the progress length. Preliminary framings of the visual content may refer to framings of the visual content that are initially presented to the user by the video editing application. For example, the video editing application may use the framings of the visual content characterized by the framing information to provide framings of the visual content within the video edit. The video editing application may provide visual representation of the framings, such as by providing preview of the framings. The video editing application may enable a user to add, remove, and/or change framings of the visual content.

Figure 9B:
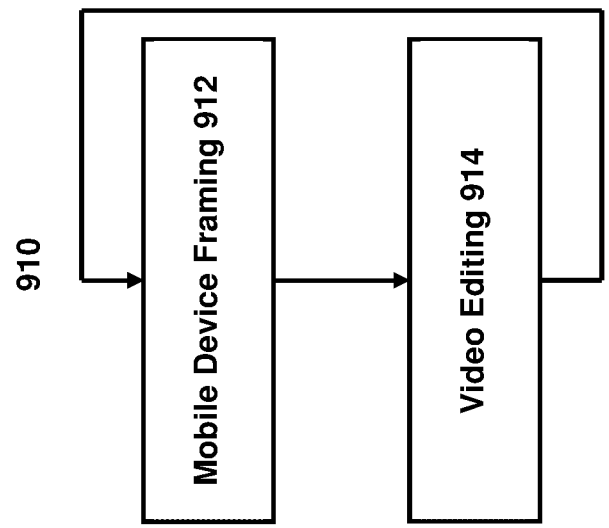
FIGS. 9A and 9B illustrate example flows for video framing.
Figure 9A:
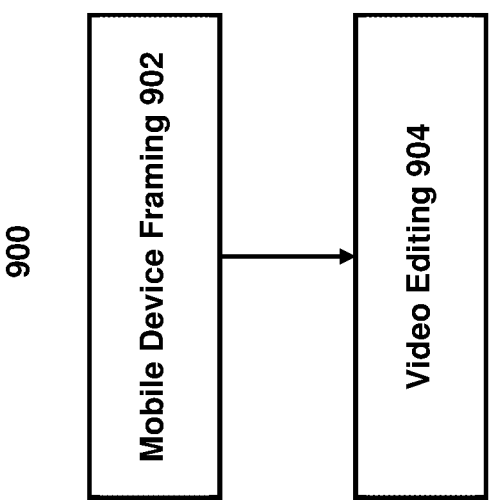

Thus, the mobile device may be used to set the framings of the visual content and the framings of the visual content may be transferred to the video edit application for use (e.g., as default framings of the visual content, for additional edits using traditional tools). FIGS. 9A and 9B illustrate example flows 900, 910 for video framing. In FIG. 9A, the flow 900 may start with mobile device framing 902, in which a user uses the mobile device to set the framings of the visual content. The flow 900 may continue to video editing 904, where the framings of the visual content set using the mobile device is used by a video editing application to provide preliminary framings of the visual content. In FIG. 9B, the flow 910 may start with mobile device framing 912, in which a user uses the mobile device to set the framings of the visual content. The flow 910 may continue to video editing 914, where the framings of the visual content set using the mobile device is used by a video editing application to provide preliminary framings of the visual content. If additional framings of the visual content are desired to be set and/or changes in the framings of the visual content are desired, the flow 910 may return to mobile device framing 912. The user may use the mobile device to set new framings of the visual content and/or modify existing framings of the visual content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
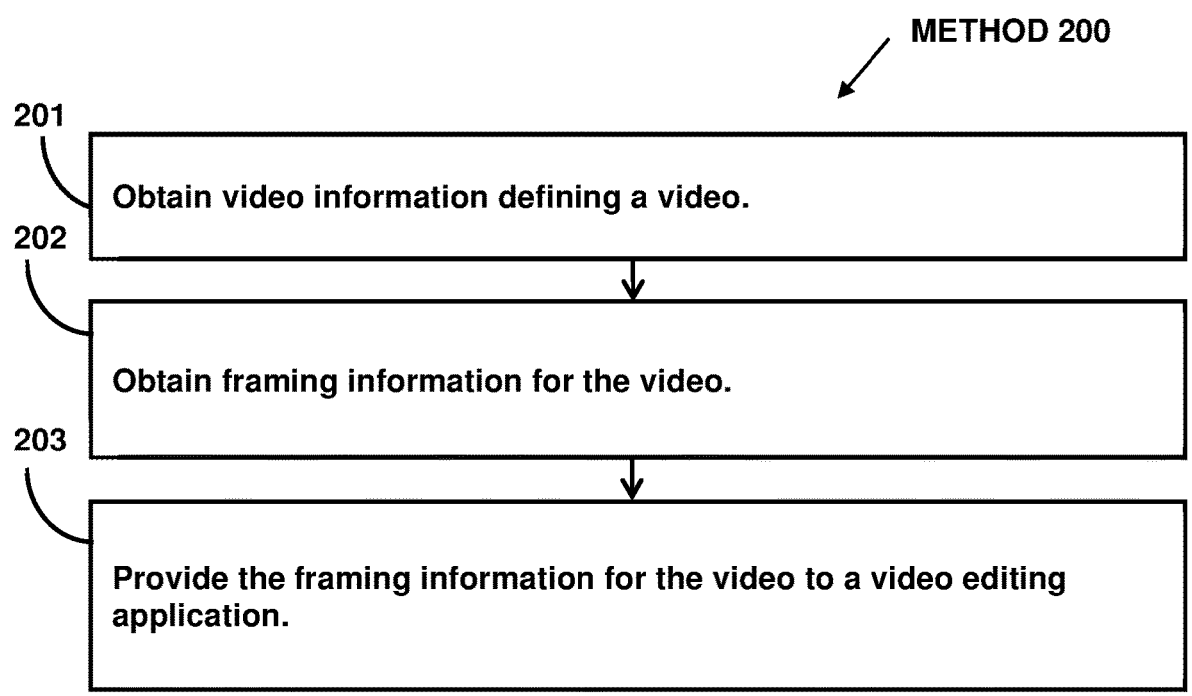
FIG. 2 illustrates a method for utilizing device orientation for video framing.

FIG. 2 illustrates method 200 for utilizing device orientation for video framing. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include video content having a progress length. The video content may include visual content viewable as a function of progress through the progress length. The visual content may have a field of view. In some implementations, operation 201 may be performed by a processor component the same as or similar to the video information component 102 (Shown in FIG. 1 and described herein).

At operation 202, framing information may be obtained. The framing information for the video may characterize one or more framings of the visual content at one or more moments within the progress length. An individual framing of the visual content may define a positioning of a viewing window within the field of view of the visual content at a corresponding moment within the progress length. The viewing window may define extents of the visual content to be included within a presentation of the video content. The framing information may be determined based on a user's interaction with a mobile device and/or other information. The mobile device may include a display. The mobile device may provide a presentation of the extents of visual content defined by the viewing window on the display to facilitate the user's interaction with the mobile device to determine the framing information. In some implementations, operation 202 may be performed by a processor component the same as or similar to the framing information component 104 (Shown in FIG. 1 and described herein).

At operation 203, the framing information for the video may be provided to a video editing application that utilizes the framing information to provide preliminary framings of the visual content at the moments within the progress length. In some implementations, operation 203 may be performed by a processor component the same as or similar to the provision component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for video framing, the system comprising:
one or more physical processors configured by machine-readable instructions to:
obtain video information defining a video, the video including video content having a progress length, the video content including visual content viewable as a function of progress through the progress length, the visual content having a field of view;
determine framing information for the video based on a user's interaction with a mobile device that controls orientation of the mobile device during a presentation of the visual content on a display of the mobile device, the presentation of the visual content on the display including a presentation of extents of visual content defined by a viewing window on the display, the framing information characterizing framings of the visual content at moments within the progress length, an individual framing of the visual content defining a positioning of the viewing window within the field of view of the visual content at a corresponding moment within the progress length, wherein the orientation of the mobile device determines where the viewing window is positioned within the field of view of the visual content; and
provide the framing information for the video to a video editing application, wherein the framing information is utilized by the video editing application to provide preliminary framings of the visual content at the moments within the progress length.

2. The system of claim 1, wherein the individual framing of the visual content defines the positioning of the viewing window within the field of view of the visual content based on a viewing direction and a viewing size of the viewing window.

3. The system of claim 2, wherein the individual framing of the visual content further defines the positioning of the viewing window within the field of view of the visual content based on a viewing rotation and/or a viewing projection of the viewing window.

4. The system of claim 1, wherein the framing information characterizes the framings based on the framing information including orientation of the mobile device as the function of the progress length of the video.

5. The system of claim 1, wherein the framing information is included within metadata of the video.

6. The system of claim 1, wherein the framings of the visual content at the moments within the progress length include multiple framings of the visual content at a point in time within the progress length.

7. The system of claim 6, wherein the multiple framings of the visual content at the point in time within the progress length extends the point in time to a duration longer than the point in time in a presentation of the visual content that utilizes the multiple framings of the visual content at the point in time within the progress length.

8. The system of claim 1, wherein the user's interaction with the mobile device sets the framings of the visual content at adjacent moments within the progress length of the video.

9. The system of claim 1, wherein the user's interaction with the mobile device set the framings of the visual content at non-adjacent moments within the progress length of the video.

10. A method for video framing, the method performed by a computing system including one or more processors, the method comprising:
obtaining, by the computing system, video information defining a video, the video including video content having a progress length, the video content including visual content viewable as a function of progress through the progress length, the visual content having a field of view;

determining, by the computing system, framing information for the video based on a user's interaction with a mobile device that controls orientation of the mobile device during a presentation of the visual content on a display of the mobile device, the presentation of the visual content on the display including a presentation of extents of visual content defined by a viewing window on the display, the framing information characterizing framings of the visual content at moments within the progress length, an individual framing of the visual content defining a positioning of the viewing window within the field of view of the visual content at a corresponding moment within the progress length, wherein the orientation of the mobile device determines where the viewing window is positioned within the field of view of the visual content; and providing, by the computing system, the framing information for the video to a video editing application, wherein the framing information is utilized by the video editing application to provide preliminary framings of the visual content at the moments within the progress length.

11. The method of claim 10, wherein the individual framing of the visual content defines the positioning of the viewing window within the field of view of the visual content based on a viewing direction and a viewing size of the viewing window.

12. The method of claim 11, wherein the individual framing of the visual content further defines the positioning of the viewing window within the field of view of the visual content based on a viewing rotation and/or a viewing projection of the viewing window.

13. The method of claim 10, wherein the framing information characterizes the framings based on the framing information including orientation of the mobile device as the function of the progress length of the video.

14. The method of claim 10, wherein the framing information is included within metadata of the video.

15. The method of claim 10, wherein the framings of the visual content at the moments within the progress length include multiple framings of the visual content at a point in time within the progress length.

16. The method of claim 15, wherein the multiple framings of the visual content at the point in time within the progress length extends the point in time to a duration longer than the point in time in a presentation of the visual content that utilizes the multiple framings of the visual content at the point in time within the progress length.

17. The method of claim 10, wherein the user's interaction with the mobile device sets the framings of the visual content at adjacent moments within the progress length of the video.

18. The method of claim 10, wherein the user's interaction with the mobile device set the framings of the visual content at non-adjacent moments within the progress length of the video.

19. A system for video framing, the system comprising:
one or more physical processors configured by machine-readable instructions to:
obtain video information defining a spherical video, the spherical video including video content having a progress length, the video content including visual content viewable from a point of view as a function of progress through the progress length, the visual content having a spherical field of view;
determine framing information for the spherical video based on a user's interaction with a mobile device that controls orientation of the mobile device during a presentation of the visual content on a display of the mobile device, the presentation of the visual content on the display including a presentation of extents of visual content defined by a viewing window on the display, the framing information characterizing framings of the visual content at moments within the progress length, an individual framing of the visual content defining a positioning of the viewing window within the spherical field of view of the visual content at a corresponding moment within the progress length, wherein the orientation of the mobile device determines where the viewing window is positioned within the spherical field of view of the visual content, wherein the user's interaction with the mobile device sets the framings of the visual content at adjacent moments and/or non-adjacent within the progress length of the spherical video; and
provide the framing information for the spherical video to a video editing application, wherein the framing information is utilized by the video editing application to provide preliminary framings of the visual content at the moments within the progress length.

20. The system of claim 19, wherein:
the framings of the visual content at the moments within the progress length include multiple framings of the visual content at a point in time within the progress length; and
the multiple framings of the visual content at the point in time within the progress length extends the point in time to a duration longer than the point in time in a presentation of the visual content that utilizes the multiple framings of the visual content at the point in time within the progress length.

* * * * *